(No Model.) 3 Sheets—Sheet 2.
T. HEPPELL & W. & J. G. PATTERSON.
MACHINERY FOR CUTTING COAL, STONE, OR OTHER HARD SUBSTANCES.

No. 533,170. Patented Jan. 29, 1895.

Witnesses
J. A. Harvey.
C. W. Patterson.

Inventors
Thomas Heppell
William Patterson
John George Patterson
by their attorney
A. Crandall Chapman

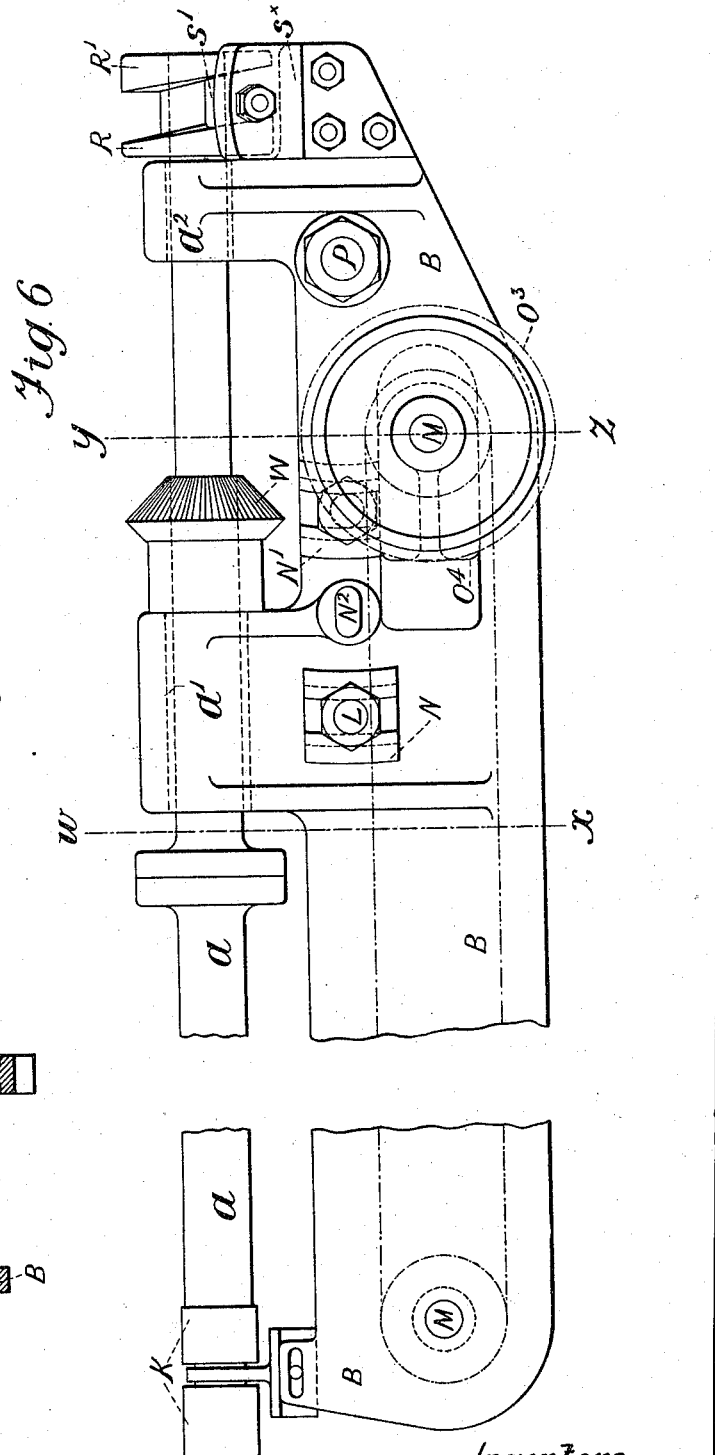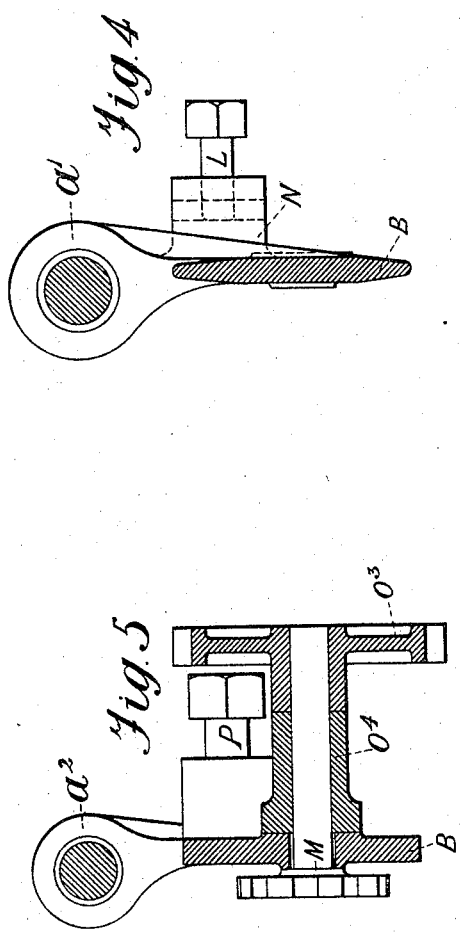

UNITED STATES PATENT OFFICE.

THOMAS HEPPELL, OF BIRTLEY, AND WILLIAM PATTERSON AND JOHN GEORGE PATTERSON, OF GATESHEAD, ENGLAND.

MACHINERY FOR CUTTING COAL, STONE, OR OTHER HARD SUBSTANCES.

SPECIFICATION forming part of Letters Patent No. 533,170, dated January 29, 1895.

Application filed July 2, 1894. Serial No. 516,307. (No model.) Patented in France September 12, 1892, No. 224,480; in England August 16, 1893, No. 15,533, and in Belgium June 22, 1894, No. 110,641.

*To all whom it may concern:*

Be it known that we, THOMAS HEPPELL, of Birtley, and WILLIAM PATTERSON and JOHN GEORGE PATTERSON, of Gateshead, in the county of Durham, England, subjects of the Queen of Great Britain and Ireland, have invented certain Improvements in Machinery for Cutting Coal, Stone, or other Hard Substances, (for which we have obtained, since the date of the execution of the application, the following patents, viz: in Great Britain, No. 15,533, dated August 16, 1893; in France, patent of addition, dated June 1, 1894, and patent of origin, No. 224,480, dated September 12, 1892, and in Belgium, patent of improvement, dated June 22, 1894, No. 110,641,) of which the following is a specification.

This invention refers to improvements in or relating to machinery for cutting coal, stone and other hard substances and is an improvement on or an improved addition to the special mechanism described in the specification of our application for patent, Serial No. 440,609, of the year 1892.

We will fully describe this improved construction or apparatus with reference to the accompanying drawings, in which—

Figure 1:
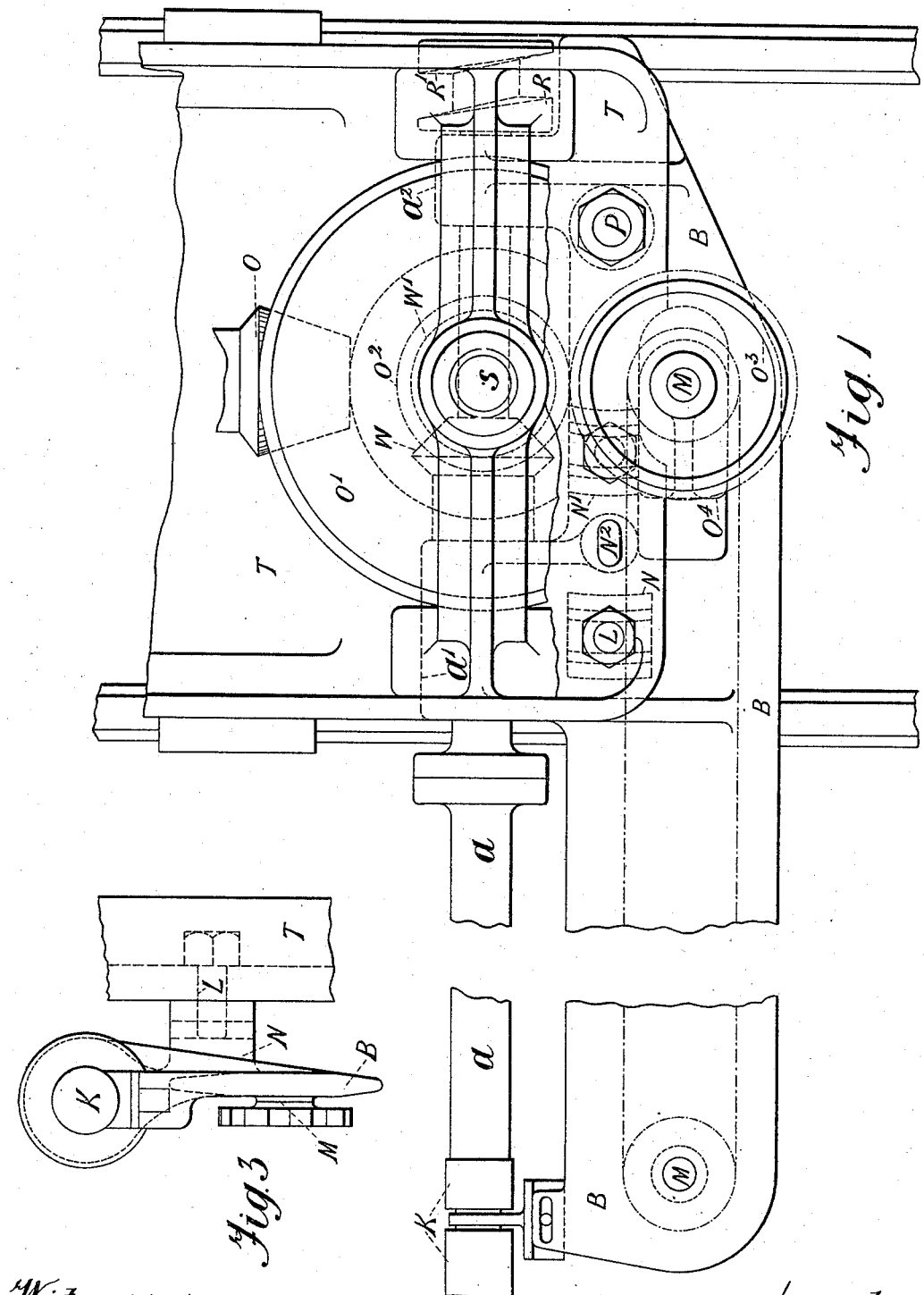
Figure 2:
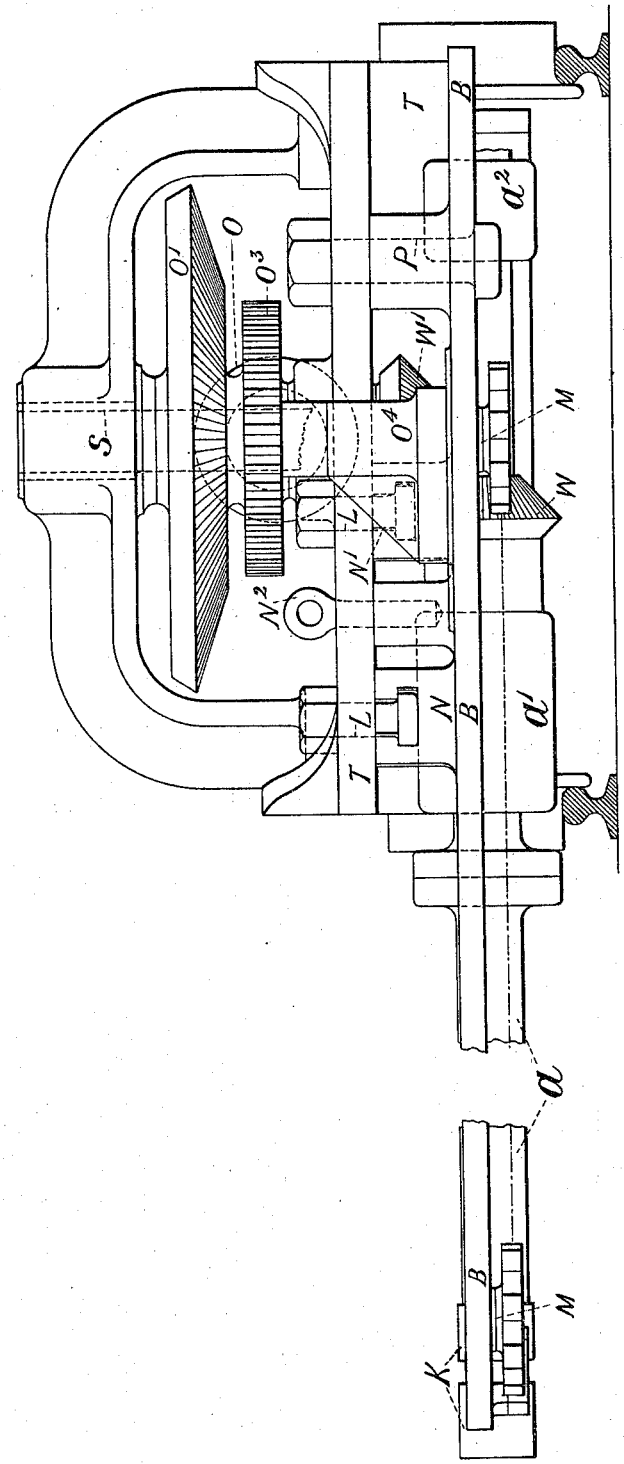

Figure 1 shows a general plan view of the whole apparatus, Fig. 2 being an end view of the same. Both these figures show the tram or trolley and the arm or bracket for carrying the cutter bar and gear fitted together in working position. Fig. 6 shows the arm or bracket and the gear adapted to swing therewith arranged separately apart from the tram or trolley in plan view. Fig. 3 shows an end elevational view as seen from the outer end of the arm or bracket. Fig. 4 shows a cross-section on line $w\,x$ in Fig. 6 of the arm. Fig. 5 shows a similar view on line $y\,z$ in Fig. 6, and in the following description like marks of reference designate like parts.

Referring to the drawings it will be observed that the cutter bar A is mounted in special bearings A', A², provided on the arm or bracket or backstay B. A miter-pinion wheel W on the cutter bar is arranged to gear with the miter wheel W' which is carried on a spindle S suitably mounted as shown in the drawings on the trolley or wagon or tram T. The pinion O driven from any suitable motor gears with spur O' to drive the cutter bar and apparatus as shown. A wheel O² on spindle S gears with wheel O³ mounted in an adjustable bracket O⁴ on the backstay to drive the end wheels of the scraper chain.

The bearing K at the outer end of the cutter bar is of the type described and illustrated in our application for patent, Serial No. 440,609, of the year 1892.

The reciprocating mechanism for giving reciprocatory motion to the cutter bar is also of the type described in our previous specification, Serial No. 440,609, of 1892; but in the present arrangement the cams R R' on the cutter bar revolving in contact with the fixed pin S' are mounted and arranged to swivel round with the backstay when required as shown very clearly in Fig. 6 where a special bracket S<sup>×</sup> is shown bolted to the end of the radial backstay to carry the fixed pin S' against which the slant-faced cams R, R' rotate.

The backstay is pivoted to the tram T by a pin P so that the backstay and its gear can be swung round on this pin as a center of motion.

At N and N' radially slotted brackets are formed on the backstay which are designed to take the T-heads of certain bolts L which serve to connect and secure the backstay to the tram T and at N² a locking pin is provided.

Compactly arranged immediately underneath the backstay and behind the cutter bar the endless chain of scrapers or débris-removing apparatus is placed the end wheels or pulleys of which are centered at M M as shown in the drawings and adapted to be driven as above described. Great convenience and advantage are obtained by thus arranging the scraper chain for while traveling in the groove or slot cut in the coal, pieces of coal keep continually falling from the upper side of the cut or slot and by the arrangement shown such coal cannot fall directly onto the scrapers arranged underneath the backstay and in this manner the risks of breakages of the scraper chain are greatly reduced. Thus when it is required for any purpose to examine the cutters or the cutter bar or apparatus therewith connected while the machine is in its working position undercutting or "kirving" the coal it is only necessary to remove the locking pin $N^2$ and to slacken the nuts of the bolts L when the whole backstay with its working parts as shown in Fig. 6 (including the cutter bar with its actuating pinion W, débris-removing apparatus with its actuating wheel $O^3$ and reciprocatory apparatus) can be swung round from underneath the tram on the pin P as a center of motion and after the necessary inspection or renewal has been made the whole can be swung back again into gear and into its working position when the pin $N^2$ must be replaced and the bolts L again tightened up. In this manner a great saving of time and labor is effected as compared with the cumbersome method hitherto employed of having to disconnect the cutter bar from the backstay or the backstay and cutter bar from the tram when any inspection of the working parts was rendered necessary.

What we claim as our invention, and desire to secure by Letters Patent, is—

1. In machines for cutting coal, stone and similar hard substances the combination of a radial backstay carrying a rotary and reciprocatory cutter bar in inner and outer bearings and a scraper chain immediately underneath the said backstay with a trolley so that the backstay and cutter bar and scraper chain can be radiated on a pivot on the trolley substantially as and for the purposes herein set forth.

2. In machines for cutting coal, stone and similar hard substances the combination of a radial backstay B carrying a cutter bar A in inner bearings $A'$ $A^2$ and an outer bearing K and a scraper chain underneath the said backstay with a trolley by a pivot P adjustable bolts L and locking pin $N^2$ all substantially as set forth.

In testimony whereof we have signed our names to this specification in the presence of two subscribing witnesses.

THOMAS HEPPELL.
WILLIAM PATTERSON.
JOHN GEORGE PATTERSON.

Witnesses:
A. CRAWHALL CHAPMAN,
E. M. PATTISON.